US006865774B2

(12) United States Patent
Devine et al.

(10) Patent No.: US 6,865,774 B2
(45) Date of Patent: Mar. 15, 2005

(54) CASTER DEVICE

(75) Inventors: Stephen M. Devine, Washington Depot, CT (US); Robert F. Karas, Cheshire, CT (US); Earl J. Reilly, Prospect, CT (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/424,445

(22) Filed: Apr. 28, 2003

(65) Prior Publication Data

US 2004/0000024 A1 Jan. 1, 2004

Related U.S. Application Data

(60) Provisional application No. 60/393,032, filed on Jul. 1, 2002.

(51) Int. Cl.[7] .............................................. B60B 33/04
(52) U.S. Cl. ......................... 16/18 R; 16/29; 248/220.1
(58) Field of Search ........................... 16/18 R, 29, 44, 16/35 D, 30, 31 R; 244/188.8, 188.9; 248/220.1, 346.11, 188.9

(56) References Cited

U.S. PATENT DOCUMENTS

| 742,770 | A | * | 10/1903 | Wheeler ........................ 16/29 |
| 2,888,706 | A | * | 6/1959 | Gibson .......................... 16/29 |
| 5,312,078 | A | * | 5/1994 | Marsh ..................... 248/220.1 |
| 6,015,123 | A | * | 1/2000 | Perez et al. ............. 248/220.1 |
| 6,324,724 | B1 | * | 12/2001 | Reilly, Jr. ...................... 16/29 |
| 6,408,482 | B1 | * | 6/2002 | Henriott et al. ................ 16/29 |

* cited by examiner

Primary Examiner—Gary Estremsky
Assistant Examiner—Mark Williams
(74) Attorney, Agent, or Firm—Mark W. Croll; Paul F. Donovan

(57) ABSTRACT

A caster device for attachment to a first and a second member of a frame is disclosed, the members being disposed angularly relative to each other to define a corner of the frame. The members define apertures and attachment slots. The device includes a caster for supporting the frame and a top plate supported by the caster. The top plate has a first and a second edge, the second edge extending angularly away from the first edge. The first edge of the top plate extends along the first member of the frame. Also, the second edge of the top plate extends along the second member of the frame. A first wall has a first and a second end, the first wall extending from the first edge of the top plate. Additionally, the first wall is aligned with and extends along the first member. A second wall has a first and a second extremity, the second wall extending from the second edge of the top plate. The second wall is aligned with and extends along the second member. A first tab extends from the first wall, the first tab extending through one of the attachment slots of the first member. Also, a second tab extends from the second wall, the second tab extending through one of the attachment slots of the second member. The first and second tabs facilitate location of the caster device relative to the corner of the frame. Moreover, a first interlocking tab defines a first hook, the first interlocking tab extending from the first wall. The first interlocking tab extends through one of the attachment slots of the first member for interlocking the device to the frame and further supporting the frame. Additionally, a second interlocking tab defines a second hook, the second interlocking tab extending from the second wall. The second interlocking tab extends through one of the attachment slots of the second member for interlocking the device to the frame and further supporting the frame.

11 Claims, 5 Drawing Sheets

CASTER DEVICE

CROSS REFERENCE TO RELATED APPLICATION

This Non-Provisional Application claims the benefit of U.S. Provisional Application Ser. No. 60/393,032 filed Jul. 1, 2002.

FIELD OF THE INVENTION

The present invention relates to a caster device for attachment to a first and a second member of a frame. More specifically, the present invention relates to a caster device for attachment to a first and a second member of a frame, the members being disposed angularly relative to each other to define a corner of the frame.

BACKGROUND OF THE INVENTION

The present invention relates generally to a caster wheel assembly. It is generally known to provide various caster wheel assemblies for cabinets, particularly, heavy cabinets. Typically, prior caster wheel assemblies are bolted directly to a frame for the cabinet. Some prior caster wheel assemblies utilize snap type holding systems for attachment to the frame. One problem with using such devices is the cost associated therewith. Another problem with using such devices is that adverse forces, such as when a cabinet is dropped, may be transferred to the fastener thereby damaging the article and/or fastener. Thus, for at least these reasons, there is a need for a new and improved caster wheel assembly.

U.S. Pat. No. 6,324,724 to Reilly, which is incorporated herein by reference, describes a caster wheel assembly. The subject invention includes, among other things, certain improvements to the device of the Reilly Patent. A pair of front tabs are used to locate the top plate with respect to the corner of the frame. The tabs inhibit the top plate from undesirably moving as a result of the interference with the frame. A pair of interlock tabs also locate the top plate relative to the frame to inhibit the top plate from moving, but the interlock tabs are also adapted to take more load. The interlock tabs are provided with a protruding hook like shape that is adapted to fit or even lock into place with respect to the frame. A pair of small screws, preferably self-tapping screws, are used simply locate the assembly relative to the frame. The tabs, primarily the interlock tabs, support the assembly so that loading forces can be transferred back to the frame and not the screws, thereby providing a more stable and robust assembly. It is noted that the receiving holes in the assembly for the screws can be slightly oversized to allow the assembly to float under load so as to further minimize any possible damage to the screws.

It is a feature of the present invention to provide a caster device that overcomes the problems associated with the prior art arrangements.

Another feature of the present invention is the provision of a caster device that is reliable in use and that is relatively low in cost.

Yet another feature of the present invention is the provision of a caster device that is stronger and more capable of withstanding shock than prior art arrangements.

Other features and advantages of the present invention will become apparent to those skilled in the art upon review of the following detailed description, claims and drawings in which like numerals are used to designate like features.

Figure 1:
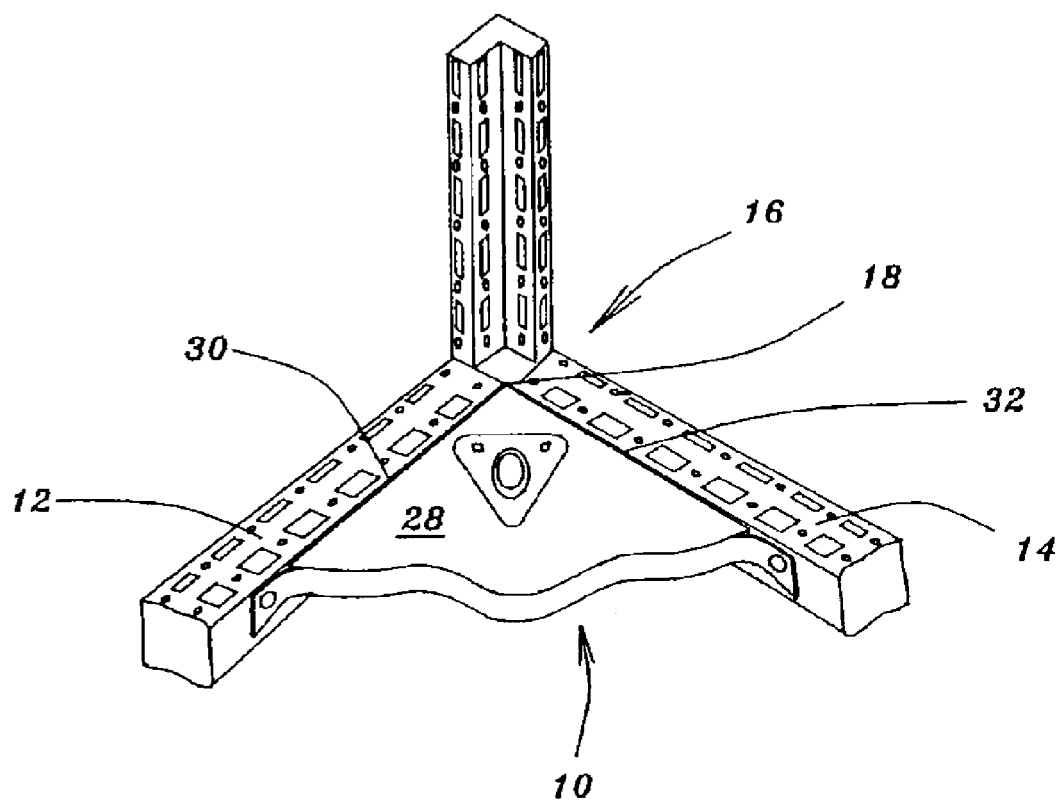
FIG. 1 is a perspective view of a caster device and frame of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENT

FIG. 1 is a perspective view of a caster device of the present invention. As shown in FIG. 1, the caster device generally designated 10 according to the present invention is provided for attachment to a first and a second member 12 and 14 respectively of a frame generally designated 16. The members 12 and 14 are disposed angularly relative to each other to define a corner 18 of the frame 16.

Figure 2:
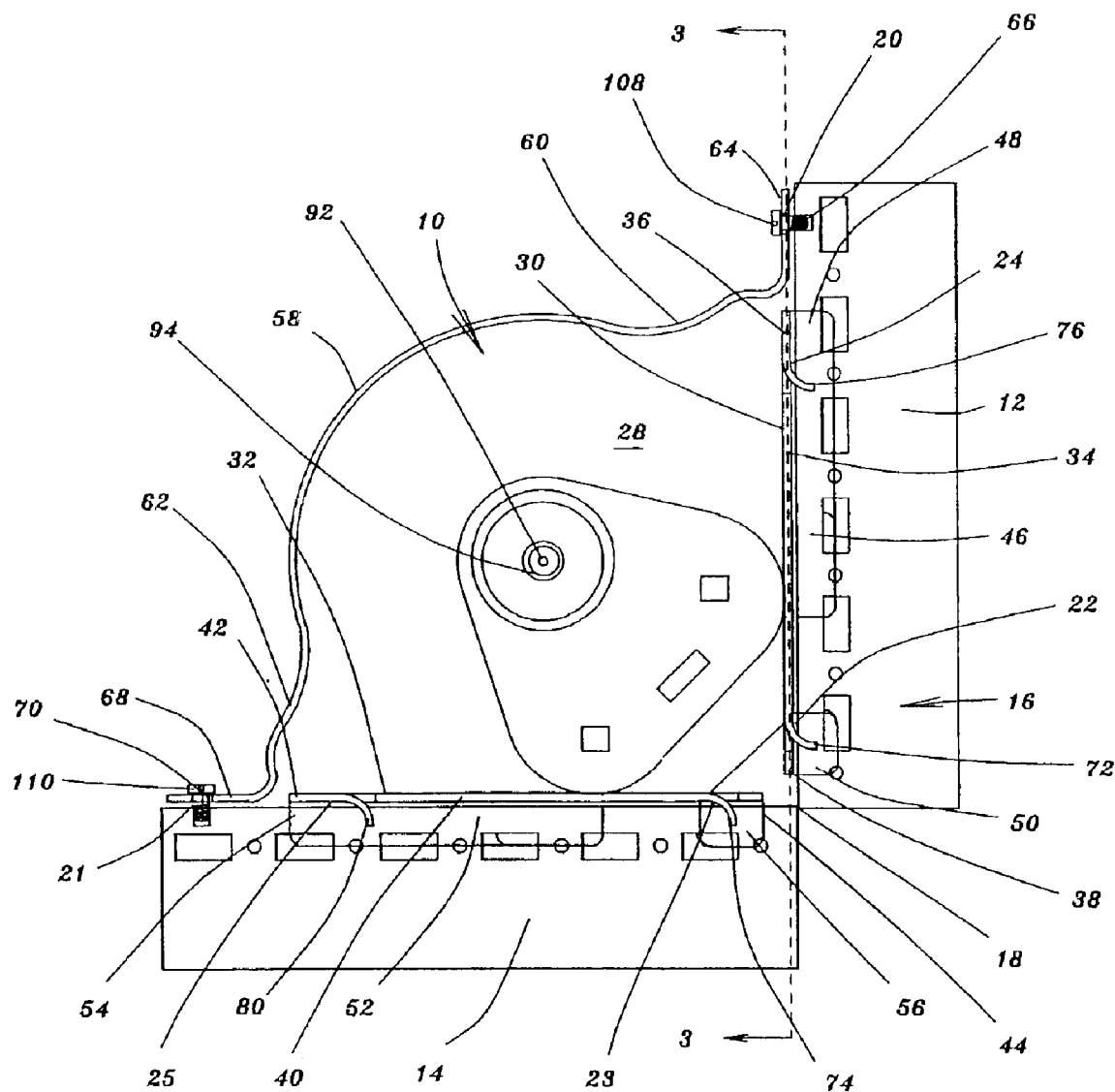
FIG. 2 is a top, partially superimposed, plan view of the caster device shown in FIG. 1.

FIG. 2 is a top, partially superimposed plan view of the caster device 10 shown in FIG. 1. As shown in FIG. 2, the members 12 and 14 define apertures 20 and 21 respectively, which can be threaded or non-threaded apertures, and attachment slots 22, 23, 24 and 25 respectively.

Figure 3:
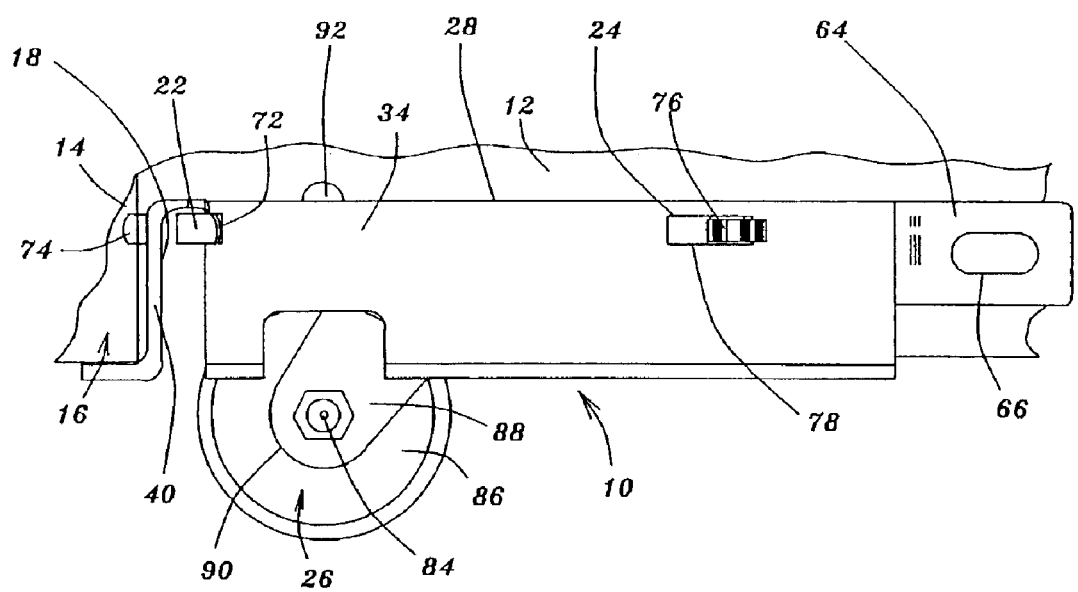
FIG. 3 is an enlarged sectional view taken on the line 3—3 of FIG. 2.

FIG. 3 is an enlarged sectional view taken on the line 3—3 of FIG. 2. As shown in FIG. 3, the device 10 includes a caster generally designated 26 for supporting the frame 16 and a top plate 28 movably supported by the caster 26.

As shown in FIG. 1, the top plate 28 has a first and a second edge 30 and 32, the second edge 32 extending angularly away from the first edge 30. The first edge 30 of the top plate 28 extends along the first member 12 of the frame 16. Also, the second edge 32 of the top plate 28 extends along the second member 14 of the frame 16.

As shown in FIG. 2, a first wall 34 has a first and a second end 36 and 38 respectively, the first wall 34 extending from the first edge 30 of the top plate 28. Additionally, the first wall 34 is aligned with and extends along the first member 12. A second wall 40 has a first and a second extremity 42 and 44 respectively, the second wall 40 extending from the second edge 32 of the top plate 28. The second wall 40 is aligned with and extends along the second member 14. A first flange 46 has a first and second termination 48 and 50 respectively, the first flange 46 extending away from the first wall 34 for engaging or supporting the first member 12. Furthermore, the first flange 46 is spaced relative to the top plate 28. A second flange 52 has a first and second side 54 and 56 respectively, the second flange 52 extending away from the second wall 40 for engaging or supporting the second member 14. The second flange 52 is spaced relative to the top plate 28. A further wall 58 has a first and a second boundary 60 and 62 respectively, the further wall 58 extending from the top plate 28 and being disposed between the first and second members 12 and 14 such that the top plate 28 is disposed between the walls 34, 40 and 58 respectively. A first ear 64 extends from the first boundary 60 of the further wall 58, the first ear 64 defining a hole 66 which is aligned with one of the apertures 20 of the first member 12. Also, a second ear 68 extends from the second boundary 62 of the further wall 58, the second ear 68 defining a further hole 70 which is aligned with one of the apertures 21 of the second member 14.

With reference to FIG. 3, a first tab 72 extends from the first wall 34, the first tab 72 extending through one of the attachment slots 22 of the first member 12.

With reference to FIG. 2, a second tab 74 extends from the second wall 40, the second tab 74 extending through one of the attachment slots 23 of the second member 14. The first and second tabs 72 and 74 respectively facilitate location of the caster device 10 relative to the corner 18 of the frame 16. Moreover, a first interlocking tab 76 defines a first hook 78 (FIG. 4), the first interlocking tab 76 extending from the first wall 34 between the first tab 72 and the first ear 64.

Figure 4:
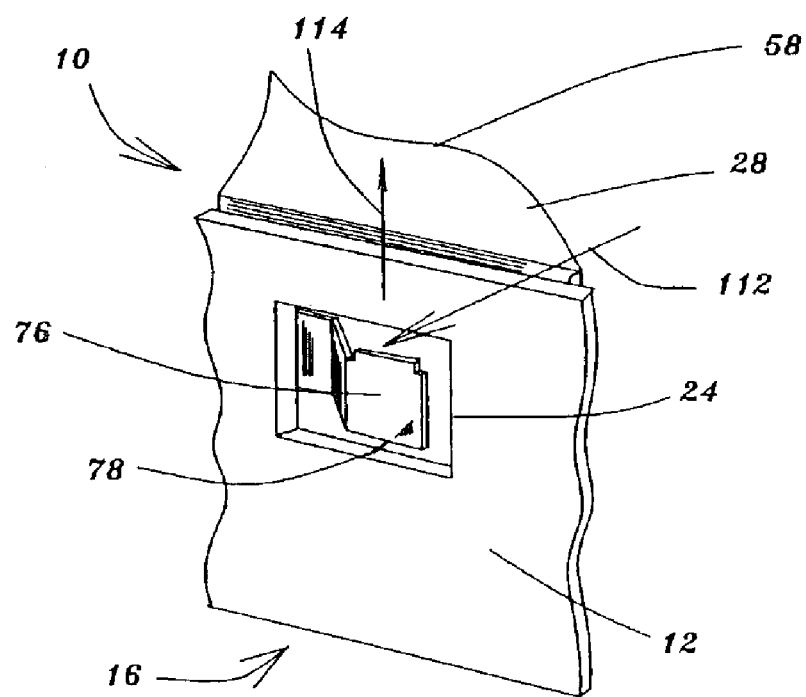
FIG. 4 is an enlarged perspective view of one of the interlocking tabs shown in FIG. 2.

FIG. 4 is an enlarged perspective view of the interlocking tab 76. As shown in FIG. 4, the first interlocking tab 76 extends through one of the attachment slots 24 of the first member 12 for interlocking the device 10 to the frame 16.

Figure 5:
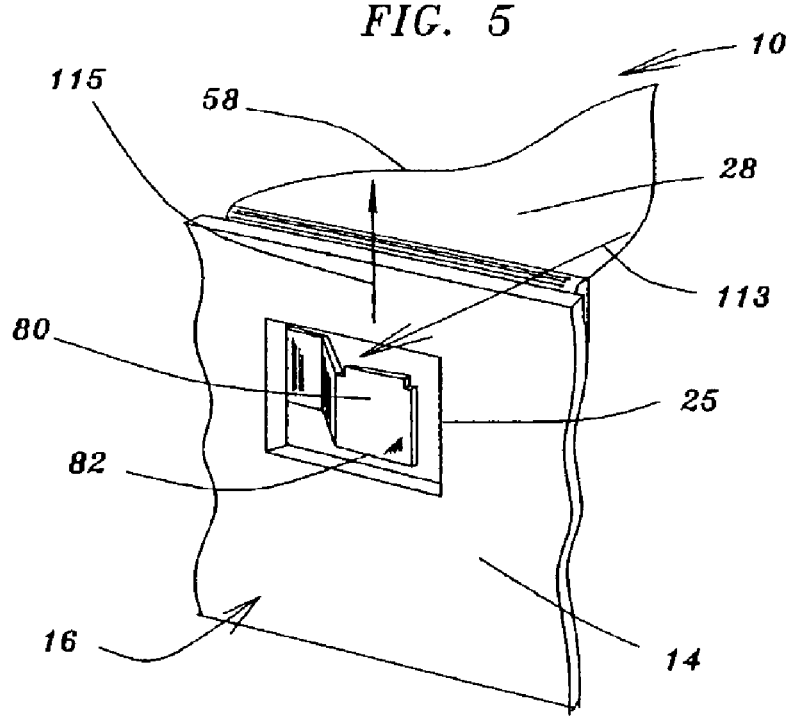
FIG. 5 is an enlarged perspective view of another interlocking tab shown in FIG. 2.

FIG. 5 is an enlarged perspective view of another interlocking tab shown in FIG. 2. As shown in FIG. 5, a second interlocking tab 80 defines a second hook 82. As shown in FIG. 2, the second interlocking tab 80 extends from the second wall 40 between the second tab 74 and the second ear 68. As shown in FIG. 5, the second interlocking tab 80 extends through one of the attachment slots 25 of the second member 14 for interlocking the device 10 to the frame 16.

Figure 6:
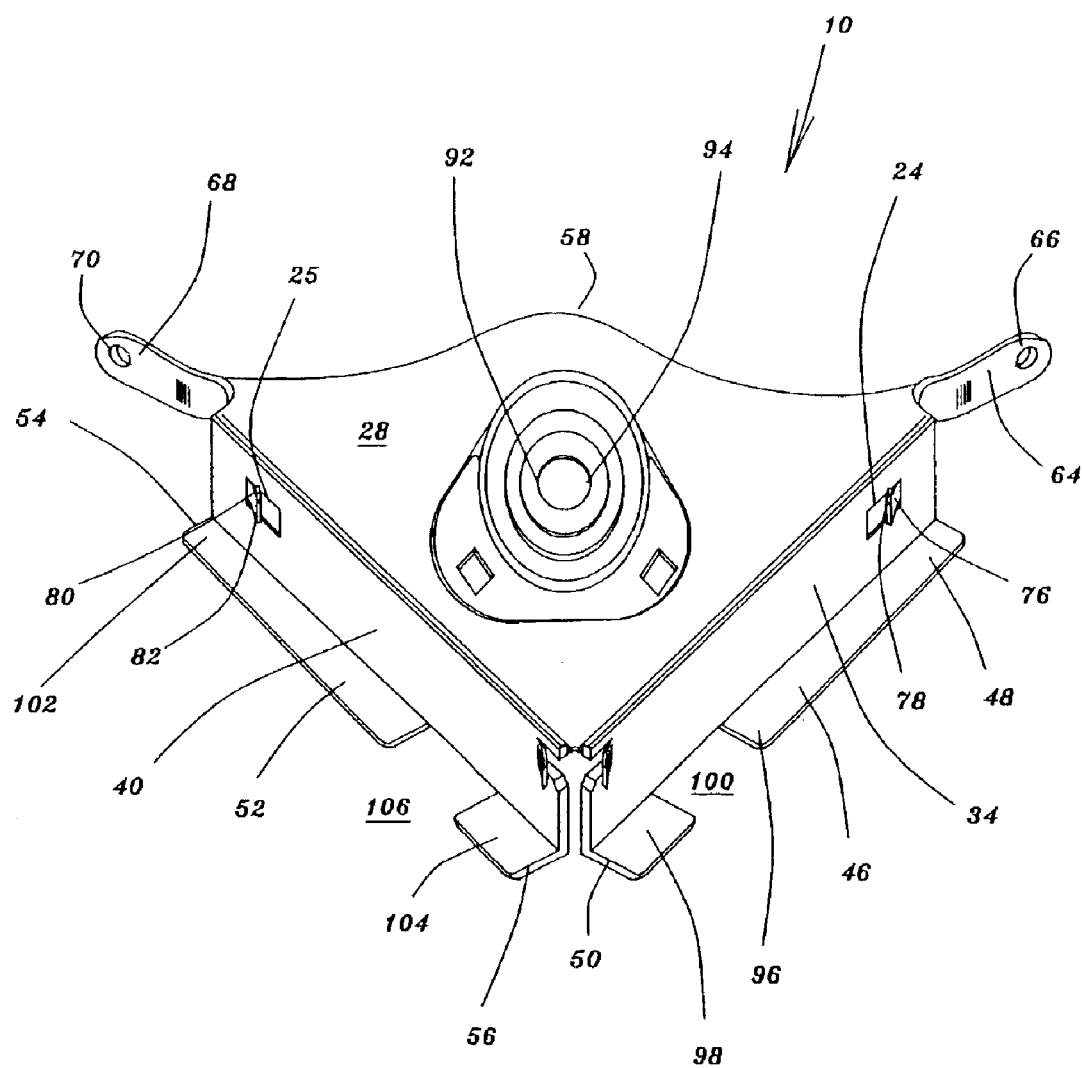
FIG. 6 is a perspective view of the caster device shown in FIG. 1.

FIG. 6 is a perspective view of the caster device 10 shown in FIG. 1. The interlocking tabs 76 and 80 interlock with the slots 24 and 25 respectively by means of the hooks 78 and 82 respectively.

More specifically, as shown in FIG. 3, the caster 26 includes an axle 84 and a wheel 86 rotatably supported by the axle 84. A forked support 88 has a first and a second end 90 and 92 respectively, the first end 90 of the support 88 supporting the axle 84 with the second end 92 of the support 88 being rotatably supported by the top plate 28.

As shown in FIG. 2, the top plate 28 is of triangular shaped configuration, the plate 28 defining an aperture 94 for the rotatable reception therein of the second end 92 of the forked support 88.

Furthermore, as shown in FIG. 6, the first wall 34 is disposed normal to the plate 28 and the second wall 40 is also disposed normal to the plate 28. Also, the first flange 46 is disposed parallel relative to the plate 28 and the second flange 52 is also disposed parallel relative to the plate 28. The plate 28, first wall 34 and the first flange 46 are of a Z-shaped transverse cross section. Similarly, the plate 28, second wall 40 and the second flange 52 are also of a Z-shaped transverse cross section. Moreover, the first flange 46 includes a first portion 96 which extends from the first termination 48 of the first flange 46. Also, a second portion 98 extends from the second termination 50 of the first flange 46 such that the first and second portions 96 and 98 define therebetween a gap 100. In a similar manner, the second flange 52 includes a first part 102 which extends from the first side 54 of the second flange 52. Also, a second part 104 extends from the second side 56 of the second flange 52, the first and second parts 102 and 104 defining therebetween a further gap 106.

As shown in FIG. 2, the further wall 58 has a sinuous or curve shaped configuration and includes a first fastener 108 which extends through the hole 66 for engagement with the aligned one of the apertures 20 for securing the first ear 64 to the first member 12. Furthermore, a second fastener 110 extends through the further hole 70 for engagement with the aligned aperture 21 for securing the second ear 68 to the second member 14.

The first tab 72 is disposed adjacent to the second end 38 of the first wall 34 and the second tab 74 is disposed adjacent to the second extremity 44 of the second wall 40. The first hook 78 of the first interlocking tab 76 is disposed adjacent to the first end 36 of the first wall 34 and the second hook 82 of the second interlocking tab 80 is disposed adjacent to the first extremity 42 of the second wall 40.

As shown in FIGS. 4 and 5, the arrangement is such that the hooks 78 and 82 respectively when located within the respective attachment slots 24 and 25 reinforce a connection between the caster device 10 and the frame 16 so that dislodgement of the caster device 10 from the frame 16 is inhibited. Moreover, the first hook 78 when located within the respective slot 24, effectively locks the first interlocking tab 76 relative to the first member 12. Also, the second hook 82 when located within the respective slot 25 effectively locks the second interlocking tab 80 relative to the second member 14. The arrangement is structured such that the first and second hooks 78 and 80 are initially located within their respective slots 24 and 25 as indicated by the arrows 112 and 113 respectively and are then moved into interlocking engagement with such slots 24 and 25 as indicated by the arrows 114 and 115 respectively.

In operation of the caster device 10 according to the present invention, the two tabs 72 and 74 are inserted into the attachment slots 22 and 23. The interlocking tabs 76 and 80 are located within the attachment slots 24 and 25 of the members 12 and 14 respectively. The interlocking tabs 76 and 80 are then moved within the slots 24 and 25 until the hooks 78 and 82 engage the edge of the slots 24 and 25 respectively so that such interlocking assists in anchoring the caster device 10 relative to the frame 16, as well as provide additional support for the frame 16. Finally, the fasteners 108 and 110 are aligned through holes 66 and 70 with the threaded apertures 20 and 21 respectively. The arrangement is such that in the event of the frame 16 being dropped, the hooks 78 and 82 rather than the fasteners 108 and 110 take the majority of the shock forces transmitted to the caster device 10 by the frame 16.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A caster device for attachment to a first and a second member of a frame, the members being disposed angularly relative to each other to define a corner of the frame, the members including apertures and attachment slots, said caster device comprising:

a top plate having a first and a second edge, said second edge extending angularly away from said first edge, said first edge of said top plate extending along the first member of the frame, said second edge of said top plate extending along the second member of the frame;

a first wall having a first and a second end, said first wall extending from said first edge of said top plate, said first wall being aligned with and extending along the first member;

a second wall having a first and a second extremity, said second wall extending from said second edge of said top plate, said second wall being aligned with and extending along the second member;

a further wall having a first and a second boundary, said further wall extending from said top plate and being disposed between the first and second members such that said top plate is disposed between said walls;

a first interlocking tab which defines a first hook, said first interlocking tab extending from said first wall and extending through one of the attachment slots of the first member for interlocking said device to the frame and further supporting the frame; and a second interlocking tab which defines a second hook, said second interlocking tab extending from said second wall extending through one of the attachment slots of the second member for interlocking said device to the frame and further supporting the frame;

wherein said hooks reinforce a connection between said caster device and the frame so that dislodgement of said caster device form the frame is inhibited, and wherein said first hook, when located within the respective slot, locks said first interlocking tab relative to the first member, and said second hook, when located within the respective slot, locks said second interlocking tab relative to the second member, the arrangement being structured such that said first and second hooks are initially located within their respective slots and are then moved into interlocking engagement with such slots, such that when located in interlocking engagement, at least a portion of said first interlocking tab extends in a direction beyond the associated attachment slot so as to be located along a portion of the first member, and at least a portion of said second interlocking tab extends in a direction beyond the associated attachment slot so as to be located along a portion of the second member, thereby locking said interlocking tabs to the members to inhibit the dislodgement thereof.

2. A caster device as set forth in claim 1, further comprising:

a first ear extending from said first boundary of said further wall, said first ear defining a hole which is aligned with one of the apertures of the first member;

a second ear extending from said second boundary of said further wall, said second ear defining a further hole which is aligned with one of the apertures of the second member;

a first tab extending from said first wall, said first tab extending through one of the attachment slots of the first member; and a second tab extending from said second wall, said second tab extending through one of the attachment slots of the second member, said first and second tabs facilitating location of said caster device relative to the corner of the frame;

wherein said first interlocking tab is located between said first tab and said first ear, and said second interlocking tab is located between said second tab and said second ear.

3. A caster device as set forth in claim 2, wherein said first tab is disposed adjacent to said second end of said first wall, and said second tab is disposed adjacent to said second extremity of said second wall.

4. A caster device as set forth in claim 2, further including:

a first fastener which extends through said hale for engagement with one of the aligned apertures for securing said first ear to the first member; and a second fastener which extends through said further hole for engagement with another one of the aligned apertures for securing said second ear to the second member.

5. A caster device as set forth in claim 2, wherein said first hook of said first interlocking tab is disposed adjacent to said first end of said first wall, and said second hook of said second interlocking tab is disposed adjacent to said first extremity of said second wall.

6. A caster device as set forth in claim 1, further comprising:

a caster for supporting the frame, wherein said caster includes an axle, a wheel rotatably supported by said axle, and a support having a first and a second end, said first end of said support supporting said axle, said second end of said support being rotatably attached to said top plate.

7. A caster device as set forth in claim 1, wherein said first wall is disposed substantially normal to said tap plate, said second wall is disposed substantially normal to said top plate, and said further wall is disposed substantially normal to said top plate, and wherein said top plate has a generally triangular shape.

8. A caster device as set forth in claim 7, said further wall has a curved or sinuous configuration.

9. A caster device as set forth in claim 1, further comprising:

a first flange having a first and second termination, said first flange extending away from said first wall for engaging the first member, said first flange being spaced relative to said top plate, said first flange being disposed parallel relative to said top plate; wherein said top plate, said first wall and said first flange have a generally Z-shaped transverse cross section; and a second flange having a first and second side, said second flange extending away from said second wall for engaging the second member, said second flange being spaced relative to said top plate, said second flange being disposed parallel relative to said top plate, wherein said top plate, said second wall and said second flange have a generally Z-shaped transverse cross section.

10. A caster device as set forth in claim 9, wherein said first flange includes a first portion which extends from said first termination of said first flange, and a second portion which extends from said second termination of said first flange, said first and second portions defining therebetween a gap, and wherein said second flange includes a first part which extends from said first side of said second flange, and a second part which extends from said second side of said second flange, said first and second parts defining therebetween a further gap.

11. A caster device for attachment to a first and a second member of a frame, the members being disposed angularly relative to each other to define a corner of the frame, the members defining apertures and attachment slots, said device comprising:

a caster;

a top plate supported by said caster, said top plate having a first and a second edge, said second edge extending angularly away from said first edge, said first edge of said top plate extending along the first member of the frame, said second edge of said top plate extending along the second member of the frame;

a first wall having a first and a second end, said first wall extending from said first edge of said tap plate, said first wall being aligned with and extending along the first member;

a second wall having a first and a second extremity, said second wall extending from said second edge of said top plate, said second wall being aligned with and extending along the second member;

a first flange having a first and second termination, said first flange extending away from said first wall, said first flange being spaced relative to said top plate;

a second flange having a first and second side, said second flange extending away from said second wall, said second flange being spaced relative to said top plate;

a further wall having a first and a second boundary, said further wall extending from said top plate and being disposed between the first and second members such that said top plate is disposed between said walls;

a first ear extending from said first boundary of said further wall, said first ear defining a hole which is aligned with one of the apertures of the first member;

a second ear extending from said second boundary of said further wall, said second ear defining a further hole which is aligned with one of the threaded apertures of the second member;

a first tab extending from said first wall, said first tab extending through one of the attachment slots of the first member;

a second tab extending from said second wall, said second tab extending through one of the attachment slots of the second member, said first and second tabs facilitating location of said caster device relative to the corner of the frame;

a first interlocking tab which defines a first hook, said first interlocking tab extending from said first wall between said first tab and said first ear, said first interlocking tab extending through one of the attachment slots of the first member for interlocking said device to the frame and further supporting the frame;

a second interlocking tab which defines a second hook, said second interlocking tab extending from said second wall between said second tab and said second ear, said second interlocking tab extending through one of the attachment slots of the second member for interlocking said device to the frame and further supporting the frame;

said first hook of said first interlocking tab being disposed adjacent to said first end of said first wall;

said second hook of said second interlocking tab being disposed adjacent to said first extremity of said second wall; and wherein said hooks, when located within the respective attachment slots, reinforce a connection between said caster device and the frame so that dislodgement of said caster device from the frame is inhibited, and wherein said hooks are configured and arranged to receive a majority of shock forces and the like transmitted to said caster device by said frame;

such that when said first hook is located within the respective slot, said first hook effectively locks said first interlocking tab relative to the first member, and such that when said second hook is located within the respective slot, said second book effectively locks said second interlocking tab relative to the second member, the arrangement being structured such that said first and second hooks are initially located within their respective slots and are then moved into interlocking engagement with such slots, and such that when located in interlocking engagement, at least a portion of said first interlocking tab extends in a direction beyond the associated attachment slot so as to be located along a portion of the first member, and at least a portion of said second interlocking tab extends in a direction beyond the associated attachment slot so as to be located along a portion of the second member, thereby locking said interlocking tabs to the members to inhibit the dislodgement thereof.

\* \* \* \* \*